(No Model.)

J. E. SÉNÉCHAL.
PNEUMATIC TIRE.

No. 527,130.  Patented Oct. 9, 1894.

Witnesses:
L. M. Hackschlager,
Geo. C. Morse

Inventor
Jules E. Sénéchal,
By Briesen & Knauth
his Attorneys.

UNITED STATES PATENT OFFICE.

JULES EMILE SÉNÉCHAL, OF PARIS, FRANCE.

PNEUMATIC TIRE.

SPECIFICATION forming part of Letters Patent No. 527,130, dated October 9, 1894.

Application filed January 25, 1894. Serial No. 498,012. (No model.) Patented in France December 6, 1892, No. 226,202.

*To all whom it may concern:*

Be it known that I, JULES EMILE SÉNÉCHAL, of the city of Paris, France, have invented Improvements in Pneumatic Tires, (for which I have obtained Letters Patent in France for fifteen years, dated December 6, 1892, No. 226,202,) of which the following is a full, clear, and exact description.

This invention is designed to obviate the disadvantages inherent to the circular form of inflated tire which too readily lends itself to perforation by making the tire of some other form preferably an approximately rectangular or trapezoidal sectional form. In order to obtain a cross sectional form other than circular, I connect the opposite sides of the air chamber together by inextensible transverse connections which limit the lateral expansion of the air chamber and so prevent it assuming the circular form, as hereinafter described and illustrated in the accompanying drawings forming part of this specification.

Figure 1:
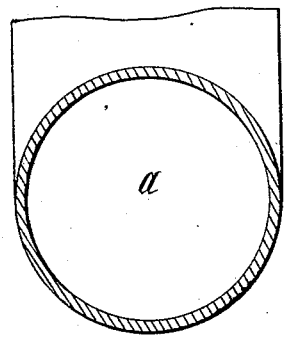
Figure 2:
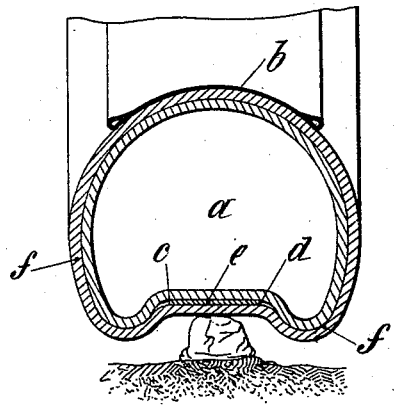
Figure 3:
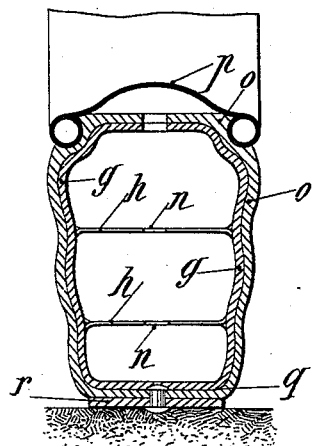
Figure 4:
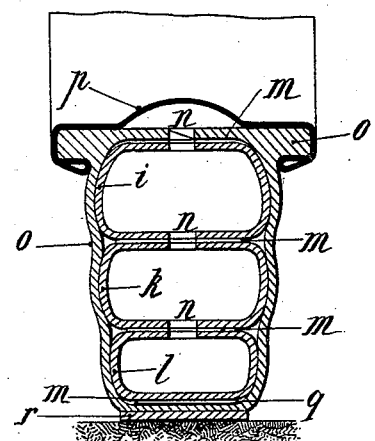

Figure 1 shows for purpose of comparison an ordinary air chamber of circular section when inflated. Fig. 2 is a similar section of an ordinary tire having a steel ribbon between the air tube and sheath, and showing how, by the form assumed when passing over a stone, the air tube is liable to be cut by the edges of the ribbon. Fig. 3 is a cross section of a tire of trapezoidal form in section, constructed according to my invention. Fig. 4 shows a modified arrangement in which several air chambers are superposed so as together to form a tire of trapezoidal section.

Referring to Fig. 1, *a* represents an inflated rubber tire. Under the action of the internal pressure the sectional form of the tire *a* when inflated will be circular, even although this section before inflation was elliptical, oval or other form. If inward radial pressure be applied to the inflated tube *a* (Fig. 2) supported on the rim *b*, it will assume the form indicated in said figure and as this change of shape will occur every time the wheel passes over an obstacle the continual fretting of the air chamber *a* and sheath *f* against the edges *c d* of the metallic ribbon *e* interposed between them will cause them to wear which is more dangerous than the perforation of the tire.

The invention consists in means whereby the tire is prevented from assuming the ordinary circular form and is caused to take another sectional form preferably trapezoidal the opposite sides of the air tube *g* being connected together by strips *h* of canvas or other inextensible material so as to limit the expansion of the tube in the lateral direction. The same result is attained by superposing several air chambers, three for example, as shown in Fig. 4. These chambers or tubes *i k l* are of different diameters and united by strips of canvas *m* cemented thereto so as to form inextensible transversely extending divisions. These combined air tubes or chambers communicate with each other by means of orifices *n* and are inclosed in a rubber canvas-lined sheath *o* mounted on the metal rim *p*. The tread portion of this sheath is lined with a steel ribbon *q* previously incased in leather, canvas, or other material in order to avoid liability of cutting by the edges of the flexible strip.

For further security and to obviate the liability of slipping when wet, the tread of the sheath *o* may have riveted or cemented to it an outer band *r* of leather, ribbed or other rubber, or other suitable material which is easily replaceable and protects the sheath from wear.

The air chamber proper whether divided by strips connecting its opposite sides or composed of superposed tubes in communication by one or more holes will as well as its sheath retain when inflated the original sectional form adopted whether rectangular, trapezoidal or other. As the divisions connecting the opposite sides of the tire are inextensible the intermediate portions only of the sides can expand laterally and give the tire a bellows-like form, and the tread being flat the sheath and air chamber are not caused to lap round the edges of the steel ribbon so that all danger of cutting from this cause is avoided and the perforation of the air chamber is rendered impossible. This new bellows forms a permanently flat tread of tire with interposed steel ribbon, is superior to all others and possesses greater flexibility combined with absolute security. Steering can be effected without dragging on the roughest roads and sharp curves.

Having now particularly described and ascertained the nature of the said invention and in what manner the same is to be performed, I declare that what I claim is—

1. A pneumatic tire consisting of a series of separate superposed air chambers polygonal in cross section and in communication with each other, substantially as described.

2. A pneumatic tire consisting of a series of superposed chambers polygonal in cross section and in open communication with each other, substantially as described.

3. A pneumatic tire consisting of a series of superposed chambers polygonal in cross section and in open communication with each other, said tire having a flat tread and a metal strip interposed between the outer chamber and said tread, substantially as and for the purposes specified.

The foregoing specification of my improvements in pneumatic tires signed by me this 10th day of January, 1894.

JULES EMILE SÉNÉCHAL.

Witnesses:
CLYDE SHROPSHIRE,
ALBERT MOREAU.